INVENTOR.
NORMAN J. JOHNSON

BY Joseph Levinson

ATTORNEY

March 29, 1966 N. J. JOHNSON 3,243,604
CLAMP-LIMIT NETWORK FOR PROVIDING A LIMITED OUTPUT
SIGNAL WHICH IS NOT AFFECTED BY NOISE
Filed June 10, 1963 2 Sheets-Sheet 2

INVENTOR.
NORMAN J. JOHNSON
BY Joseph Levinson
ATTORNEY

United States Patent Office 3,243,604

Patented Mar. 29, 1966

3,243,604
CLAMP-LIMIT NETWORK FOR PROVIDING A LIMITED OUTPUT SIGNAL WHICH IS NOT AFFECTED BY NOISE

Norman J. Johnson, Norwalk, Conn., assignor to Barnes Engineering Company, Stamford, Conn., a corporation of Delaware Filed June 10, 1963, Ser. No. 286,686
5 Claims. (Cl. 307—88.5)

Figure 1:
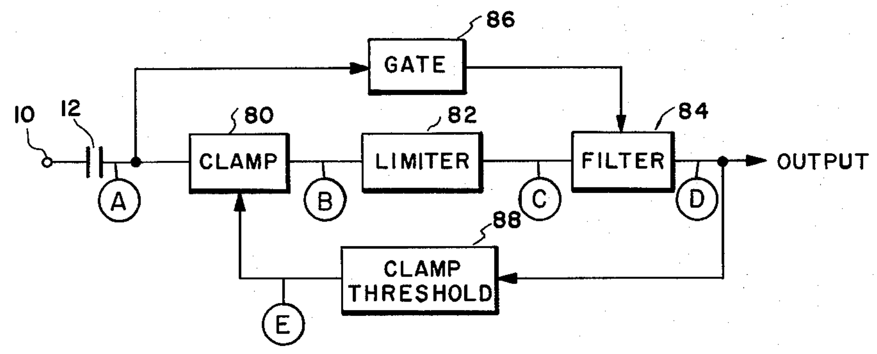

This invention relates to an input clamp circuit for establishing a controlled amplitude and direct current level from a variable amplitude input signal in the presence of background interference noise, while not affecting pulse width.

A problem which is encountered in the electronic processing of input signals, which invariably include background interference noise and spurious signals, is the extraction from such signals of a desired wave shape. The specific wave shapes which are desired to be extracted from the received signals are used to perform a variety of control functions which would not be properly performed if the desired wave shape is not extracted from the signals received. The background noise and spurious signals often lead to faulty operation of the functions controlled if means are not provided for eliminating or minimizing the effect of such noise or spurious signals.

Accordingly, it is an object of this invention to provide a new and improved input clamp and limiter circuit which provides an output of predetermined wave shape in the presence of spurious background noise and interference signals in the signal being processed.

Although the present problem and its solution are not restricted thereto, one important field where the aforesaid problem exists is in horizon sensors. Horizon sensors scan over a wide circle which intersects the earth at two points, which produces a signal corresponding to the radiation received, thus generating a signal having a rectangular wave shape. The leading and trailing edges of this rectangular wave shape correspond to the points where the horizon sensor scan crosses the horizon. Pitch and roll error signals are sensed by the pulse phase and pulse amplitude of the received signals, and are used to adjust the attitude of the vehicle in which the sensor is carried. It is essential that the processing circuitry, to operate properly, have a rectangular wave shape of fixed amplitude dependent only on horizon crossovers on which to operate. The problem of obtaining the desired wave shape is complicated by background noise and spurious signals generated by the sun, clouds, moon, etc.

It is an object of this invention to provide a new and improved input circuit for a horizon sensor which produces a rectangular wave shape of fixed amplitude and with fixed direct current level even in the presence at the input of background interference signals.

It is another object of this invention to provide an electronic processing circuit for a horizon sensor which eliminates spurious amplitude variations and suppresses other forms of background noise signals in a relatively simplified configuration.

In carrying out this invention in one illustrative embodiment thereof, an input clamp circuit is provided for maintaining the signal pulse width and limiting the amplitude of an input signal which includes background noise. The input signal is applied at the clamp means, then to a limiter, and then to a filter. Feedback means are connected from the output of the filter to the input of the clamp means for setting the clamping level of the input signal in accordance with the difference between the reference level and the maximum or minimum peaks of the output signal of the filter. By setting the clamping level of the clamp means in accordance with the output of the filter, and by providing clamping and limiting ahead of the filter, the input signal is limited and filtered with reference ot the predetermind reference level which is independent of the noise level of the input signal. This results in an output from the filter which repeatedly provides an output signal amplitude which is constant.

Figure 2:
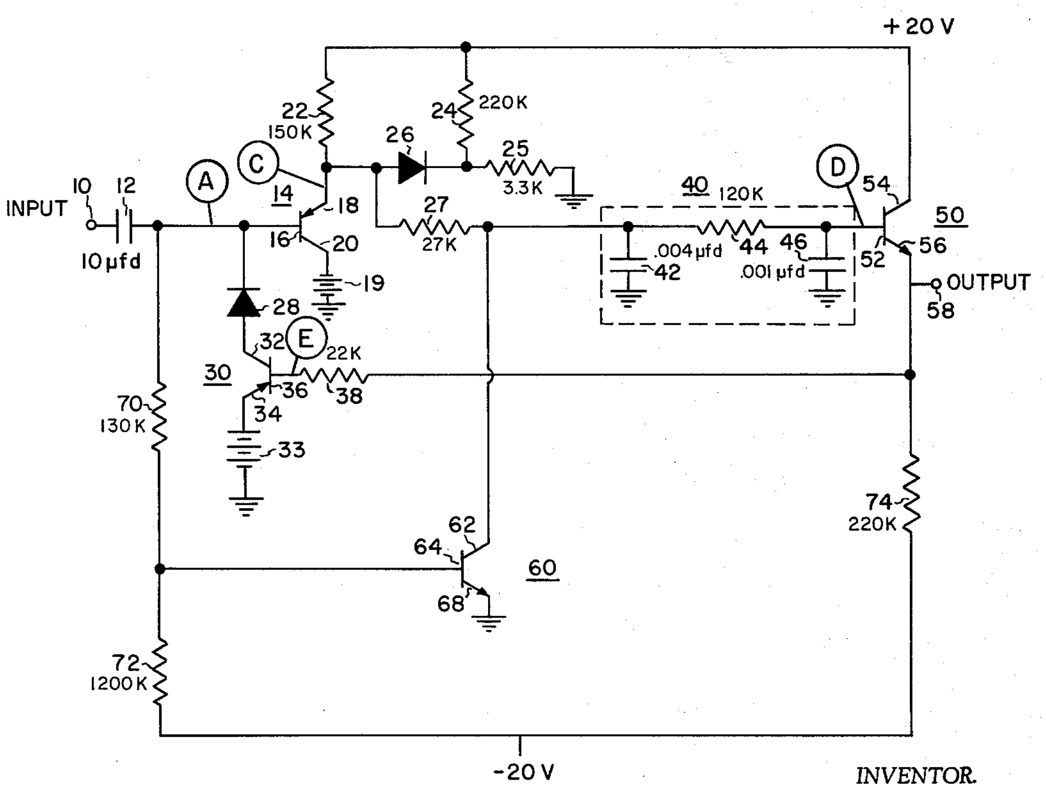
Figure 3A:
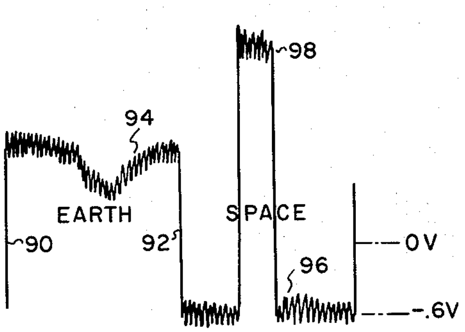
Figure 3B:
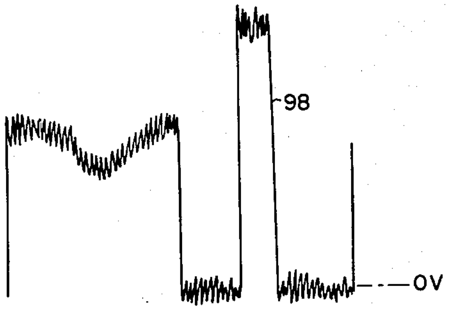
Figure 3C:
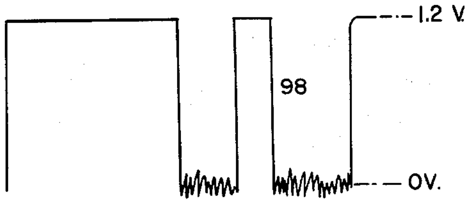
Figure 3D:
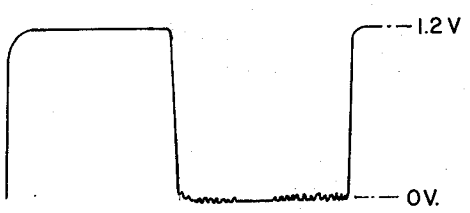
Figure 3E:

The invention, both as to organization and method of operation, together with further objects and advantages thereof, may best be understood by reference to the following description taken in connection with the accompanying drawings, in which:

FIG. 1 is a block diagram of the input limiter and clamp circuit embodied in this invention, FIG. 2 is an electrical schematic diagram of the input clamp and limiter circuit of FIG. 1, and FIGS. 3A–E show a plurality of wave forms appearing at specified points in FIGS. 1 and 2 which illustrate the operation of the specific configuration shown in FIG. 2.

The input clamp circuit, as provided in this invention, performs the function of providing a desired wave shape from an input signal which is accompanied by background interference signals, which has a specified amplitude so that it may be utilized to provide accurate control functions. Since the circuit as set forth performs the aforesaid function regardless of the source of such signals, the invention is restricted only to those applications which require signals having accurately controlled amplitudes and direct current levels. However, since the invention has an important application in the field of horizon sensors, it will be described in connection therewith.

Referring now to FIG. 1, input signals are applied at input terminal 10, and are coupled through a capacitor 12 to a clamp 80, a limiter 82, and a filter 84, in the order named. A clamp threshold 88 is coupled between the output of the filter 84 to the clamp 80. Clamp threshold 88 functions to detect the minimum or maximum output peaks from the filter 84, and feeds back a current to the clamp 80 to clamp the input to this minimum or maximum output. Whether the circuit is clamped to the minimum or maximum output peaks of varying direct current, which may both be considered as the peak excursions of the D.C. signal, will depend on the particular application in which the circuit is used. The limiter 82 functions to limit the amplitude of the input signal to a predetermined level above the reference level which is set by the clamp and the clamp threshold. Both the clamping and limiting functions are performed prior to the signals entering the filter 84, but both functions are controlled by the output of the filter 84. Since the amplitude of the processed signal is clamped to a specific reference level, wide artificial changes in amplitude which could be present in the input signal, due to various degrees of background noise and interference, are eliminated. If spurious amplitude variations were allowed, the time delay provided by the filter would vary the position of the trailing edge of the output at a given level with respect to the input, which would vary the pulse width of the output. With the amplitude of the input signal being accurately limited, the time delay through the filter is always the same, thereby producing an output in which the leading and trailing edges of the signal do not vary with input amplitude variations.

A gating circuit 86, which is shown in an application Serial No. 218,002 filed August 20, 1962, may be utilized with the present invention, and would be particularly useful in combination with the present invention for horizon sensor applications. The gating circuit 86 is connected between an input of the clamp 80 and the input of the filter 84. The gate functions to eliminate spurious signals which are greater than the amplitude levels set by the limiter 82, which, of course, is also referred to the D.C. level set by the clamp circuit.

In FIG. 2 a detailed schematic is provided, in which circuit values are set forth to illustrate an operative embodiment of the input clamp and limiter circuit as would be applicable for use in a horizon sensor. All resistor values are in kilo-ohms, while all capacitors are microfarads. It will be appreciated that these values are given merely for illustrative purposes, and the invention is not considered limited thereto. An input signal is applied to the input terminal 10 and coupled through a coupling capacitor 12 to a base electrode 16 of a transistor 14 which also has an emitter electrode 18 and a collector electrode 20 connected through a source of potential 19 to ground. The transistor 14 is connected in an emitter follower arrangement with the emitter electrode 18 connected through a resistor 22 to a source of positive potential. Bias is provided for the base electrode 16 through serially connected resistors 70 and 72, which are connected to a source of negative potential. A unilateral conducting device 26 is connected to the emitter electrode 18 and to the junction of a voltage divider comprised of resistors 24 and 25, which are serially connected between a source of positive potential and ground. Unilateral conducting device 26 acts as a limiter, and when the amplitude of the signal from the emitter electrode 18 exceeds the biasing potential provided by the voltage divider resistors 24 and 25, the unilateral conducting device 26 becomes conductive, limiting the potential increase at the emitter electrode 18 by the low parallel impedance of resistors 24 and 25. The signal appearing at emitter electrode 18 is coupled to a two section filter 40 which is comprised of resistors 27 and 44 and capacitors 42 and 46. The output of the filter 40 is connected to a base elecrtode 52 of a transistor 50 which also has a collector electrode 54 connected to a source of positive potential and an emitter electrode 56 which is connected to an output terminal 58 and through a load resistor 74 to a source of negative potential. The emitter electrode 56 of transistor 50 is also connected through a resistance 38 to a base electrode 36 of a transistor 30. The transistor 30 has an emitter electrode connected through a source of positive potential 33 to ground or to any desired reference potential, and a collector electrode connected through a unilateral conducting device 28 to the base 16 of transistor 14. The transistor 30 and the unilateral conducting device 28 provide feedback from the output of the filter 40 to the input of the transistor 14 which, for application in horizon sensors, would clamp the input signal level of transistor 14 to a level such that the minimum base voltage of transistor 50 corresponds to the signal received from space or zero volts. The transistor 30 is biased such that if the minimum signal at base 52 of transistor 50 falls below zero volts, the transistor 30 is placed into conduction, as is unilateral conducting device 28, permitting current to flow into capacitor 12, raising the D.C. level at the base 16 of transistor 14 and eventually the level at the base 52 of transistor 50. Capacitor 12 filters the feedback current and prevents high frequency interaction between output and input.

The circuit of FIG. 2 is also provided with a gating circuit, which includes a transistor 60 having a base electrode 64, a collector electrode 62, and an emitter electrode 68. The base electrode 64 is connected to the junction of transistors 70 and 72, which provide a voltage divider biasing network therefor, and the collector electrode 62 is connected to the first section of filter 40, and the emitter electrode 68 is connected to ground. The transistor 60 is biased such that when the amplitude of the incoming signal exceeds a limiting level set by the ratio of resistors 70 and 72, transistor 60 begins conducting to short to ground the input of filter 40, which effectively eliminates high amplitude positive spurious signals which would occur, for example, in horizon sensors from the sun. The operation of this gate requires the precision D.C. level produced by the clamp circuit.

FIG. 3 shows a plurality of wave forms which occur at various points on the circuit of FIGS. 1 and 2 in accordance with the component values illustrated thereon for a signal generated in a horizon sensor. The wave forms are indicated on specified points of FIGS. 1 and 2 for purposes of illustration. The wave form A appearing at the input terminal 10 is of rectangular shape having leading edge 90 and trailing edge 92 corresponding to the points where the sensor scan crosses the horizon. The D.C. level is not established. The upper portion of the wave form 94 includes spurious amplitude variations due to clouds. The portion of the signal 96 representing space is of substantially lower level, and is illustrated to include a large spurious signal pulse 98 which may be generated if the horizon sensor sees the sun during its space scan period. On passing the clamp 80, the space side of the signal is clamped so that the minimum signal output peak from the filter 84 is at zero volts, as is shown in waveform B. The minimum level of signal B is consequently somewhat below zero volts, depending on the amount of noise present. The waveform C, appearing after the signal passes limiter 82, has the earth signal limited to a predetermined level, thereby removing the noise and amplitude variations therefrom. The waveform D appearing at the output of the filter 84 shows that the spurious high amplitude pulse 98 has been eliminated by the gate 86 and the high frequency noise on the space portion of the signal has been filtered. Waveform E, the current to the clamp threshold circuit 88, illustrates the feedback which is applied to the clamp 80 for maintaining the input reference clamp level at capacitor 12 at a level to establish output waveform D at zero volts in the space portion. It will be observed that the clipping level provided by the limiter 82 is always at a predetermined level regardless of the noise signals appearing at the input. Since a constant amplitude signal is always applied to the filter, the leading edge 90 and the trailing edge 92 will always be delayed by an unvarying amount to provide correct pulse widths. It will also be noted that the clamping level is set from the output of a combination filter, gate, and limiter. Clearly other active and passive networks could be substituted for this combination without modifying the functioning of the feedback controlled clamp.

The input clamp and filter circuit embodied in this invention maintains the leading and trailing edges of pulses at a specific pulse width while clamping the signal to a specific level regardless of the noise level which accompanies the input signal. Accordingly, the circuit is not only useful for horizon sensors, but in radar, telemetry, or other applications where output referenced D.C. level stability is desired in the presence of background interference noise.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A clamp-limit network for providing a limited output signal which is not affected by the presence or absence of noise, said network comprising (a) a capacitor coupled to a source of input signals which may include noise, (b) a first D.C. ampilfier having an input connected to said capacitor and an output, (c) means for biasing said first amplifier below a predetermined clamp level, (d) a limiter connected to the output of said first amplifier for limiting the amplitude of output signals from said first amplifier, (e) a low-pass filter having an input connected to receive the output signals from said first amplifier and an output, (f) a second D.C. amplifier having an input connected to the output of said filter and an output, (g) threshold means connected between the output of said second amplifier and the input of said first amplifier for providing a drive signal opposite in polarity to the biasing means of said first amplifier whenever the output of said second amplifier drops below said predetermined clamp level, whereby the clamp function at the input of said first amplifier is derived from the signal at the output of said second amplifier after filtering and the limiting function is accomplished at the output of said first amplifier before filtering.

2. The network set forth in claim 1 wherein said limiter comprises a unilateral conducting device biased for conduction at a predetermined level for preventing the output of said first amplifier from exceeding said predetermined level.

3. The network set forth in claim 1 wherein said threshold means includes a transistor which is biased to be conductive whenever the output of said second amplifier drops below said predetermined clamping level, and a unilateral conducting device which is connected between the output of said transistor and the input of said first amplifier which is conductive when said transistor is conductive for applying said drive signal to said first amplifier.

4. The network set forth in claim 3 wherein said limiter comprises a unilateral conducting device biased for conduction at a predetermined level for preventing the output of said first amplifier from exceeding said predetermined level.

5. The network set forth in claim 4 wherein said first and second amplifiers are transistors.

References Cited by the Examiner

UNITED STATES PATENTS

| | | | |
|---|---|---|---|
| 2,783,377 | 2/1957 | Wofford | 328—165 |
| 3,018,386 | 1/1962 | Chase | 307—88.5/5 |
| 3,058,068 | 10/1962 | Hinrichs et al. | 307—88.5/5 |
| 3,167,718 | 1/1965 | Davis et al. | 307—88.5/18 |

FOREIGN PATENTS

| | | |
|---|---|---|
| 1,261,967 | 4/1961 | France. |

JAMES D. KALLAM, *Acting Primary Examiner.*

ARTHUR GAUSS, *Examiner.*

J. D. CRAIG, *Assistant Examiner.*